United States Patent Office 2,852,577
Patented Sept. 16, 1958

---

2,852,577

PREPARATION OF ALKYLATED AROMATIC COMPOUNDS

Louis Schmerling, Riverside, Ill., assignor to Universal Oil Products Company, Des Plaines, Ill., a corporation of Delaware No Drawing. Application April 24, 1956
Serial No. 580,173

18 Claims. (Cl. 260—671)

This invention relates to a process for the alkylation of aromatic compounds, and more particularly to a process for improving the yields of mono-alkylated aromatic compounds.

It has now been discovered that the yields of mono-alkylated aromatic compounds resulting from the alkylation of an alkylatable aromatic hydrocarbon containing a replaceable hydrogen atom with an alkyne will be greatly improved by the addition of a saturated hydrocarbon containing a tertiary carbon atom (or a saturated hydrocarbon which isomerizes under the reaction conditions to form a hydrocarbon containing a tertiary carbon atom) to the reaction mixture. It is to be understood that the term "mono-alkylated aromatic compounds," as used in this invention, refers to aromatic compounds in which a hydrogen atom is replaced by an alkyl, cycloalkyl, cycloalkylalkyl or aralkyl radical.

It is, therefore, an object of this invention to prepare alkylated aromatic compounds by alkylating alkylatable aromatic compounds with a saturated hydrocarbon and an alkyne.

A further object of this invention is to improve the yields of mono-alkylated aromatic compounds which are obtained by alkylating an alkylatable aromatic compound containing a replaceable hydrogen atom with a saturated hydrocarbon containing a tertiary carbon atom and an alkyne.

One embodiment of this invention resides in a process for the preparation of derivatives of aromatic compounds which comprises alkylating an alkylatable aromatic compound with a saturated hydrocarbon containing a tertiary carbon atom and an alkyne in the presence of a Friedel-Crafts catalyst at alkylation conditions, and recovering the resultant product.

A specific embodiment of this invention resides in a process for the preparation of derivatives of benzene which comprises alkylating benzene with a saturated hydrocarbon containing a tertiary carbon atom and an alkyne in the presence of a Friedel-Crafts catalyst selected from the group consisting of aluminum chloride, aluminum bromide, zirconium chloride and boron fluoride at alkylation conditions, and recovering the resultant derivatives of benzene.

A more specific embodiment of the invention is found in a process for the preparation of derivatives of benzene which comprises alkylating benzene with methylcyclohexane and acetylene in the presence of aluminum chloride at alkylation conditions, and recovering the resultant ethylbenzene and methylcyclohexylbenzene.

Other objects and embodiments referring to alternative alkylatable aromatic hydrocarbons, saturated hydrocarbons containing a tertiary carbon atom and alkynes will be referred to in the following further detailed description of this invention.

The mono-alkylated aromatic compounds prepared according to the process of this invention may find a variety of uses, mainly as intermediates in the preparation of other organic compounds. For example, the products of this invention may be used as intermediates in the preparation of detergents, for example, by sulfonation. Other uses are as intermediates in the preparation of pharmaceuticals, resins, fine chemicals, etc. For example, the alkyl and cycloalkylbenzenes can be nitrated and then reduced with iron and hydrochloric acid to the corresponding alkyl and cycloalkylanilines useful as antioxidants and for other purposes. Ethylbenzene prepared by the process of this invention may be converted to styrene, used in the manufacture of plastics and rubbers, by thermal or catalytic dehydrogenation.

The saturated hydrocarbons are useful as a part of the reaction due to the fact that they act as hydrogen donors, and are condensed with the alkylatable aromatic compounds, thereby increasing the yield of the alkylated aromatic compound. The novel observation that the saturated hydrocarbon as well as the alkyne enters into the reaction to form derivatives of the aromatic hydrocarbon used is illustrated by the equations hereinafter set forth using benzene, acetylene and methylcyclopentane as examples of the compounds used:

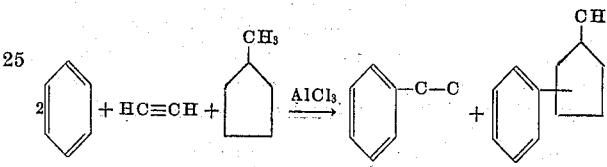

Suitable saturated hydrocarbons which may be used in the process of this invention include those hydrocarbons containing a tertiary carbon atom or which may undergo isomerization under the reaction conditions of the present process to form a hydrocarbon containing a tertiary carbon atom. These saturated hydrocarbons include paraffins and cycloparaffins, the paraffins including isobutane, isopentane, 2-methylpentane, 3-methylpentane, 2,3-dimethylbutane, 2,3-dimethylpentane, 2-methylhexane, 3-methylhexane, 2,3-dimethylhexane, etc; cycloparaffins which may be used include methylcyclopentane, methylcyclohexane, methylcycloheptane, ethylcyclopentane, propylcyclopentane, ethylcyclohexane, propylcyclohexane, 1,2-dimethylcyclopentane, 1,3-dimethylcyclopentane, 1,2-diethylcyclopentane, 1,2 - dimethylcyclohexane, 1,2-diethylcyclohexane, etc; decahydronaphthalene, alkyldecahydronaphthalenes, etc.; hexahydroindan, etc.

In addition, such hydrocarbons as n-butane, n-pentane and cyclohexane which may, under the operating conditions of the present process, isomerize to form isobutane, isopentane and methylcyclopentane respectively may also be used.

The alkylating agents, comprising alkynes, which may be used in this process include acetylene, propyne, 1-butyne, 2-butyne, 1-pentyne, 2-pentyne, 3-methyl-1-butyne, 1-hexyne, 2-hexyne, 3-hexyne, etc.

Aromatic hydrocarbons which may be alkylated by the aforementioned alkynes and the saturated hydrocarbons containing a tertiary carbon atom according to the process of this invention are those which are designated as alkylatable aromatic hydrocarbons and contain a replaceable hydrogen atom. Examples of aromatic hydrocarbons falling within this definition include benzene, toluene, o-, m- and p-xylene, 1,2,3-trimethylbenzene, 1,2,4-trimethylbenzene, 1,3,5-trimethylbenzene, etc., ethylbenzene, propylbenzene, isopropylbenzene, the butylbenzenes, etc., 1,2-diethylbenzene, 1,2,3-triethylbenzene, 1,2,4-triethylbenzene, 1,2-dipropylbenzene, 1,3-dispropylbenzene, 1,4-dipropylbenzene, 1,2,3-tripropylbenzene, 1,2,4-tripropylbenzene, 1,4-di-isopropylbenzene, p-cymene, etc.; polycyclic aromatic compounds including naphthalene, 1-methylnaphthalene, 2-methylnaphthalene, 1-ethylnaphthalene, 2-ethylnaphthalene, 1-propylnaphthalene, 2-propylnaphthalene, etc., 1,4-dimethylnaphthalene, 1,2-diethylnaphthalene, 1,5-dipropylnaphthalene, etc., 1,2,3-trimethylnaphthalene, 1,2,4-trimethylnaphthalene, 1,2,3-triethylnaphthalene, etc., 1,2,3,4-tetrahydronaphthalene, indene, indan, etc., biphenyl, terphenyl, etc., anthracene, 1-methylanthracene, 2-methylanthracene, 1-ethylanthracene, 2-ethylanthracene, 9,10-dimethylanthracene, 1,2-dimethylanthracene, 1,2-diethylanthracene, etc., 9,10-dipropylanthracene, etc., phenanthrene, 1-methylphenanthrene, 2-methylphenanthrene, 1-ethylphenanthrene, 2-ethylphenanthrene, etc., 1,2-dimethylphenanthrene, 1,3-dimethylphenanthrene, 1,2-diethylphenanthrene, etc., chrysene, 1-methylchrysene, 2-methylchrysene, 1-ethylchrysene, 2-ethylchrysene, 1,2-dimethylchrysene, 1,2-diethylchrysene, 1,3-dimethylchrysene, 1,3-diethylchrysene, etc., pyrene, 1-methylpyrene, 2-methylpyrene, 1-ethylpyrene, 2-ethylpyrene, etc., 1,2-diethylpyrene, 1,3-dimethylpyrene, 1,3-diethylpyrene, etc. It is to be understood that the above mentioned alkylatable aromatic hydrocarbons are set forth only as examples of the compounds which may be used in this process and that any aromatic compounds containing a replaceable hydrogen atom which will undergo alkylation with an alkylating agent under the conditions of this invention may be used in the process of the present invention. This will include other substituted aromatic compounds other than those enumerated above such as the phenols, anilines, and halogen-substituted aromatics such as chlorobenzene, bromobenzene, dichlorobenzene, dibromobenzene, chloronaphthalene, bromonaphthalene, dichloronaphthalene, dibromonaphthalene, etc., and the like.

The reaction conditions under which the process of the present invention proceeds will depend largely upon the reactants and the catalyst used. The reaction is usually catalyzed by the use of a Friedel-Crafts type catalyst, the preferred catalyst comprising aluminum chloride, aluminum bromide, zirconium chloride, and boron fluoride, although other metallic halides of this class such as ferric chloride may be used, but not necessarily with equivalent results. Generally, temperatures ranging from about $-20°$ to about $150°$ C. or more will be used in the reaction, the preferred range, especially when aluminum chloride is used to catalyze the reaction, being in the range of from about $-20°$ to about $+80°$ C.

The process of this invention may be effected in any suitable manner and may comprise either a batch or continuous type operation. When a batch type operation is used, a quantity of the starting material, namely, the alkylating agent, the aromatic hydrocarbon and the saturated hydrocarbon containing a tertiary carbon atom are gradually added to a mixture of the aromatic hydrocarbon and the catalyst in a suitable reaction vessel provided with stirring means. The vessel is then heated or cooled to the desired temperature depending upon the reactants and catalysts used in the process. After a predetermined reaction time has elapsed, the desired reaction product is separated from the catalyst layer and recovered from the unreacted starting materials by conventional means, for example, by washing, drying and fractional distillation.

Another method of operation of the present process is of the continuous type. A particularly suitable type of operation comprises a fixed bed type in which the condensation catalyst is disposed as a bed in a reaction zone, said zone being maintained at suitable operating conditions of temperature and pressure. The aromatic compound, saturated hydrocarbon and the alkylating agent are passed therethrough in a continuous stream, and the alkylating agent, dissolved if so desired, in aromatic compound or saturated hydrocarbon, in another stream is introduced into the reaction zone. The alkylation of the aromatic hydrocarbon will continue until the desired time has elapsed after which the reaction product will be continuously withdrawn from the reaction zone, the liquid product separated from the catalyst and distilled to yield unreacted alkylating agent, aromatic compound and the saturated compound, the latter three being recycled for use as a portion of the starting material while the mono-alkylated aromatic compounds will be withdrawn and purified by conventional means hereinbefore set forth. The reaction zone in which the reaction takes place will be an unpacked vessel or coil or it may contain a solid adsorbent such as fire brick, alumina, dehydrated bauxite, and the like.

Other continuous types of processes which may be used in this invention include the fluidized type of operation, the compact moving bed type of operation and the slurry type process.

The following examples are given to illustrate the process of this invention which, however, are not intended to limit the generally broad scope of the present invention in strict accordance therewith.

*Example I*

A mixture of 241 g. of benzene, 239 g. of methylcyclohexane and 8 g. of aluminum chloride was placed in a glass alkylating flask. The temperature was raised to approximately $75°$ C. and acetylene bubbled into said flask for a period of four hours. During this time the temperature was increased to $82°$ C. At the end of the reaction period the reaction mixture had gained 16 g. in weight. The opaque, dark amber upper layer weighing 433 g. was decanted from the viscous dark lower layer which weighed 21 g. The separated upper layer was washed with water, dilute alkali, dried and subjected to fractional distillation under reduced pressure. 20 g. (corresponding to a 30% yield) of ethylbenzene and 54 g. (corresponding to a 50% yield) of methylcyclohexylbenzene were recovered.

*Example II*

A solution of benzene and methylcyclopentane along with a catalytic amount of aluminum chloride is placed in a glass alkylating flask. The temperature of the flask is raised to approximately $80°$ C. and propyne bubbled into said flask for a period of about four hours. At the end of the reaction period the upper layer is separated from the lower catalyst layer, washed with water, dilute alkali, dried and subjected to fractional distillation under reduced pressure. Isopropylbenzene and methylcyclopentylbenzene are recovered as separate cuts from the distillation.

I claim as my invention:

1. A process for the preparation of derivatives of aromatic compounds which comprises alkylating an alkylatable aromatic compound selected from the group consisting of aromatic hydrocarbons and nuclearly substituted hydroxy, halogen and amino derivatives of aromatic hydrocarbons with a saturated hydrocarbon containing a tertiary carbon atom and an alkyne hydrocarbon containing from 2 to about 6 carbon atoms per molecule in the presence of a Friedel-Crafts catalyst at alkylation conditions, and recovering the resultant products.

2. A process for the preparation of derivatives of aromatic hydrocarbons which comprises alkylating an alkylatable aromatic hydrocarbon with a saturated hydrocarbon containing a tertiary carbon atom and an alkyne hydrocarbon containing from 2 to about 6 carbon atoms per molecule in the presence of a Friedel-Crafts catalyst at alkylation conditions, and recovering the resultant products.

3. A process for the preparation of derivatives of aromatic hydrocarbons which comprises alkylating an alkylatable aromatic hydrocarbon with a saturated hydrocarbon containing a tertiary carbon atom and an alkyne hydrocarbon containing from 2 to about 6 carbon atoms per molecule in the presence of a Friedel-Crafts catalyst selected from the group consisting of aluminum chloride, aluminum bromide, zirconium chloride and boron fluoride at alkylation conditions, and recovering the resultant products.

4. A process for the preparation of derivatives of aromatic hydrocarbons which comprises alkylating an alkylatable aromatic hydrocarbon with an isoparaffin and an alkyne hydrocarbon containing from 2 to about 6 carbon atoms per molecule in the presence of a Friedel-Crafts catalyst selected from the group consisting of aluminum chloride, aluminum bromide, zirconium chloride and boron fluoride at alkylation conditions, and recovering the resultant products.

5. A process for the preparation of derivatives of aromatic hydrocarbons which comprises alkylating an alkylatable aromatic hydrocarbon with an alkylcycloparaffin and an alkyne hydrocarbon containing from 2 to about 6 carbon atoms per molecule in the presence of a Friedel-Crafts catalyst selected from the group consisting of aluminum chloride, aluminum bromide, zirconium chloride and boron fluoride at alkylation conditions, and recovering the resultant products.

6. A process for the preparation of derivatives of aromatic hydrocarbons which comprises alkylating an alkylatable aromatic hydrocarbon with a saturated hydrocarbon containing a tertiary carbon atom and an alkyne hydrocarbon containing from 2 to about 6 carbon atoms per molecule in the presence of aluminum chloride at alkylation conditions, and recovering the resultant alkylation products.

7. A process for the preparation of derivatives of aromatic hydrocarbons which comprises alkylating an alkylatable aromatic hydrocarbon with a saturated hydrocarbon containing a tertiary carbon atom and an alkyne hydrocarbon containing from 2 to about 6 carbon atoms per molecule in the presence of aluminum bromide at alkylation conditions, and recovering the resultant alkylation products.

8. A process for the preparation of derivatives of aromatic hydrocarbons which comprises alkylating an alkylatable aromatic hydrocarbon with a saturated hydrocarbon containing a tertiary carbon atom and an alkyne hydrocarbon containing from 2 to about 6 carbon atoms per molecule in the presence of zirconium chloride at alkylation conditions, and recovering the resultant alkylation products.

9. A process for the preparation of derivatives of aromatic hydrocarbons which comprises alkylating an alkylatable aromatic hydrocarbon with a saturated hydrocarbon containing a tertiary carbon atom and an alkyne hydrocarbon containing from 2 to about 6 carbon atoms per molecule in the presence of boron fluoride at alkylation conditions, and recovering the resultant alkylation products.

10. A process for the preparation of derivatives of aromatic hydrocarbons which comprises alkylating an alkylatable aromatic hydrocarbon with methylcyclohexane and an alkyne hydrocarbon containing from 2 to about 6 carbon atoms per molecule in the presence of a Friedel-Crafts catalyst at alkylation conditions, and recovering the resultant alkylation product.

11. A process for the preparation of derivatives of benzene which comprises alkylating benzene with a saturated hydrocarbon containing a tertiary carbon atom and an alkyne hydrocarbon containing from 2 to about 6 carbon atoms per molecule in the presence of a Friedel-Crafts catalyst selected from the group consisting of aluminum chloride, aluminum bromide, zirconium chloride and boron fluoride at alkylation conditions, and recovering the resultant derivatives of benzene.

12. A process for the preparation of derivatives of toluene which comprises alkylating toluene with a saturated hydrocarbon containing a tertiary carbon atom and an alkyne hydrocarbon containing from 2 to about 6 carbon atoms per molecule in the presence of a Friedel-Crafts catalyst selected from the group consisting of aluminum chloride, aluminum bromide, zirconium chloride and boron fluoride at alkylation conditions, and recovering the resultant derivatives of toluene.

13. A process for the preparation of derivatives of xylene which comprises alkylating xylene with a saturated hydrocarbon containing a tertiary carbon atom and an alkyne hydrocarbon containing from 2 to about 6 carbon atoms per molecule in the presence of a Friedel-Crafts catalyst selected from the group consisting of aluminum chloride, aluminum bromide, zirconium chloride and boron fluoride at alkylation conditions, and recovering the resultant derivatives of xylene.

14. A process for the preparation of derivatives of benzene which comprises alkylating benzene with methylcyclohexane and acetylene in the presence of aluminum chloride at alkylation conditions, and recovering the resultant ethyl benzene and methylcyclohexylbenzene.

15. A process for the preparation of derivatives of benzene which comprises alkylating benzene with methylcyclohexane and propyne in the presence of aluminum chloride at alkylation conditions, and recovering the resultant propylbenzene and methylcyclohexylbenzene.

16. A process for the preparation of derivatives of benzene which comprises alkylating benzene with methylcyclohexane and butyne in the presence of aluminum chloride at alkylation conditions, and recovering the resultant butylbenzene and methylcyclohexylbenzene.

17. A process for the preparation of derivatives of aromatic hydrocarbons which comprises alkylating an alkylatable aromatic hydrocarbon with a saturated hydrocarbon containing a tertiary carbon atom and acetylene in the presence of a Fridel-Crafts catalyst at alkylation conditions, and recovering the resultant products.

18. A process for the preparation of derivatives of aromatic hydrocarbons which comprises alkylating an alkylatable aromatic hydrocarbon with a saturated hydrocarbon containing a tertiary carbon atom and propyne in the presence of a Friedel-Crafts catalyst at alkylation conditions, and recovering the resultant products.

References Cited in the file of this patent

UNITED STATES PATENTS

| | | |
|---|---|---|
| 2,402,243 | Egloff | June 18, 1946 |
| 2,759,029 | Schmerling | Aug. 14, 1956 |
| 2,759,030 | Schmerling | Aug. 14, 1956 |

OTHER REFERENCES

Egloff et al.: Thermal Reactions of Aromatic Hydrocarbons (1932), U. O. P. Booklet # 132, Universal Oil Products Co., 310 S. Michigan Avenue, Chicago, Ill., pp. 35–8 only.